Nov. 22, 1932.  M. ESNARD  1,888,378
FAUCET
Filed June 8, 1931
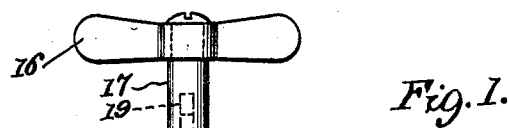
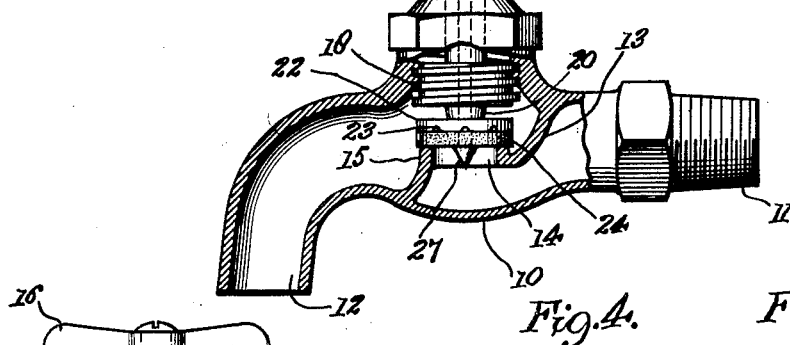
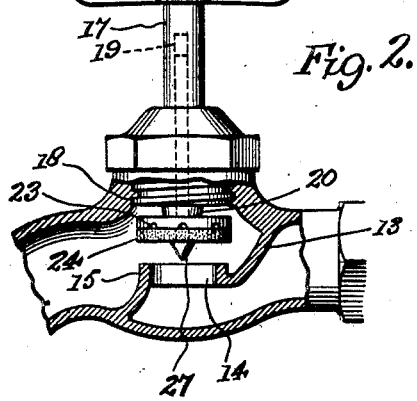
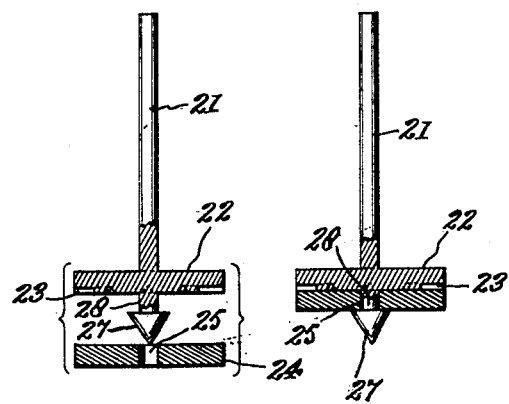
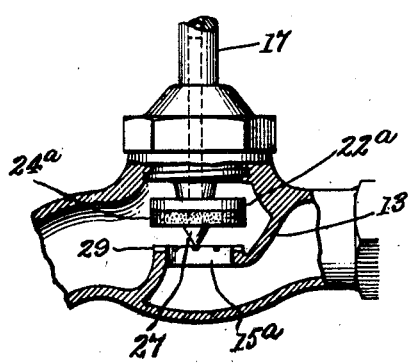
Inventor
M. Esnard
by Wilkinson & Mawhinney
Attorneys.

Patented Nov. 22, 1932

1,888,378

UNITED STATES PATENT OFFICE

MIGUEL ESNARD, OF MATANZAS, CUBA

FAUCET

Application filed June 8, 1931, Serial No. 543,138, and in Cuba July 24, 1930.

The present invention relates to improvements in faucets, and has for an object to provide an improved faucet so constructed that when the washer of the valve becomes worn immediate repair will be provoked by reason of the fact that the flow of water in great quantities cannot be checked.

Another object of the invention is to provide an improved faucet in which the screw threads are protected and in which an improved form of valve is employed dispensing with the customary screw connection between the backing plate or valve head and washer.

Other objects of the invention are to simplify the construction of faucets and to make the same less expensive, while insuring at all times that the faucet be kept in a proper state of repair against any leakage whatsoever or any detriment to the parts.

With the foregoing and other objects in view, the invention will be more fully described hereinafter and will be more particularly pointed out in the claims appended hereto.

In the drawing, wherein like symbols refer to like or corresponding parts throughout the several views, Figure 1 is a side view of the improved faucet with parts broken away and showing the valve in a closed position.

Figure 2 is a similar view with the valve in the open position.

Figure 3 is an enlarged sectional view taken through the improved form of valve stem and handle.

Figure 4 is a sectional view of the improved valve with the parts separated.

Figure 5 is a similar view with the parts assembled.

Figure 6 is a bottom plan view of the valve backing disc, and

Figure 7 is a side view with parts broken away showing a modified form of valve in open position.

Referring more particularly to the drawing 10 designates the faucet shell or casing having the screw nipple 11 for connecting with the water supply pipe and the delivery spout 12. In the intermediate part of the casing 10 is a diaphragm 13 through which extends the port 14 surrounded by the valve seat 15.

The handle of the valve is shown at 16; the same being connected in the usual manner to a stem 17, which is of peculiar form in that, besides having the usual threaded tap or head 18, such stem 17 is provided with an internal bore 19 closed at its top but opening through the bottom thereof; and there is also produced upon this stem 17 a lower extension or neck 20 below the tap 18.

Playing freely within the hollow bore 19 is a shank 21 carrying at its lower portion the brass or other stiff backing disc or plate 22. There is a water tight fit between the backing disc 22 and the shank 21. For instance these two parts may be soldered together. The lower face or bottom of the disc 22 is provided with radial grooves or it may be provided with undulations, ridges or other roughened or irregular parts or surfaces 23 whereby the entire lower surface of the disc 22 will not seat upon the valve seat 15 when the washer 24 is worn. This washer 24, which is of rubber or other flexible material, is provided with a central opening 25. A conical or other enlarged head 27 is adapted to be passed through the restricted opening 25. The head 27 is carried upon the lower end of the neck 28, which forms in effect a prolongation or extension of the shank 21.

In the use of the device, Figure 1 shows the closed position of the parts, and in Figure 2 is illustrated the opening position thereof. The washer 24 is simply forced against the backing disc 22, whereupon the conical head 27 snaps through the opening 25 of the washer 24. The rubber material of the washer will contract about the neck 28 and such washer will be held rigidly against the disc 22.

The shank 21 with the assembled backing disc and washer 24 is inserted freely into the hollow bore 19 of the stem 17. These parts will by gravity seek a position against the valve seat 15 but unless the neck 20 of the stem is screwed down tightly against the backing plate 22, the force of the water entering through the connection 11 and up through the port 14 will easily unseat the valve and permit the issuance of water through the nozzle 12. When the handle 16 is turned so as to screw down the tap 18 and force the washer 24 tightly against the valve seat 15 the water will be cut off from the nozzle 12. By rotating the handle 16 in the opposite direction the neck 20 will be withdrawn from the backing plate 22 allowing of the water raising the valve and flowing out the nozzle 12 as heretofore described.

Now when the washer 24 becomes so worn that it is no longer of any use, the practice heretofore existing of postponing repair so long as the backing disc 22 itself will form a valve although an ineffective one will be discouraged and checked because of the fact that the grooved lower surface of the backing plate 22 will prevent any tight fit between the backing plate and the valve seat 15. Consequently water will flow out from the nozzle 12 at such a rapid rate as to not only attract attention to the worn condition of the washer 24 but also to actually cause serious raise in the water rent.

With valves as now constructed the backing plates are used for weeks, months and sometimes years after the washers are worn out, and while they do not effect a satisfactory closure still the water comes out drop by drop, or there is a leakage to a more or less extent but not sufficient to cause negligent house holders to correct the faulty faucet. As a result of forcing the brass backing plate 22 against the seat 15, considerable stress and strain devolves upon the screw threads of the tap 18 and the valve casing 10 and these threads are destroyed in time beyond repair. Where the washer 24 is kept in good repair and renewed frequently as required by the present invention, this disaster to the screw threads is avoided as very little pressure is required to seat the yielding rubber washer 24.

It will also be noted that the use of a screw ordinarily employed to hold the fiber or other packing or washer to the valve head or backing disc is dispensed with as this screw breaks easily and when it happens the faucet is used without the washer thus destroying the threads.

With the improved valve there is always a perfect fit of valve to valve seat so that a tight valve is always had in which no leakage can occur and when the valve washer is worn out an unchecked and volume flow will occur such as to demand immediate attention and the renewal of the washer 24.

In Figure 7 there is shown a modification in which the valve seat 15a is provided with the grooved surface 29 and the washer 24a will be of soft material so as to be forced down into the grooves of the valve seat whereby to make a tight fit. In this case the backing plate 22a may be devoid of any grooves and may have a smooth lower face.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved faucet comprising a casing having a valve seat therein, a valve movable toward and from said seat and including a backing plate having a groove on its lower side, and a rubber washer removably affixed to the lower side of said plate and acting to close against said valve seat.

2. An improved faucet comprising a casing having a valve seat therein, a washer of rubber or like material adapted to close yieldably against said valve seat, a backing plate adapted to receive removably the washer thereagainst and having a grooved surface opposed to the washer and valve seat, a shank carrying said backing plate, and a stem threadedly engaged with the casing and loosely receiving said shank.

3. An improved faucet comprising a casing having a valve seat therein, a stem having threaded connection with the casing and provided with a hollow bore and an extension neck, a shank of shorter length than said bore fitting loosely therein, a plate carried on the lower portion of said shank and having a grooved lower surface opposed to said valve seat, and a yieldable valve facing carried by said backing plate.

4. An improved faucet comprising a casing having a valve seat therein, a stem movably connected with said casing, a backing plate having a grooved lower surface loosely guided by said stem, a constricted neck and enlarged head extending from said backing plate, and a resilient washer having a constricted opening for receiving said neck and head.

MIGUEL ESNARD.